(12) United States Patent
Andrieu et al.

(10) Patent No.: US 12,208,914 B2
(45) Date of Patent: Jan. 28, 2025

(54) TANK SYSTEM WITH A VALVE IN THE FORM OF A PENDULUM SYSTEM

(71) Applicants: Airbus Operations SAS, Toulouse (FR); Airbus SAS, Blagnac (FR)

(72) Inventors: Thomas Andrieu, Toulouse (FR); Jérôme Milliere, Toulouse (FR); Julien Laverne, Toulouse (FR); Jonathan Landolt, Blagnac (FR)

(73) Assignees: Airbus Operations SAS, Toulouse (FR); Airbus SAS, Blagnac (FR)

(*) Notice: Subject to any disclaimer, the term of this patent is extended or adjusted under 35 U.S.C. 154(b) by 0 days.

(21) Appl. No.: 18/339,328

(22) Filed: Jun. 22, 2023

(65) Prior Publication Data

US 2023/0415909 A1  Dec. 28, 2023

(51) Int. Cl.
  *B64D 37/22*  (2006.01)
  *B64D 37/06*  (2006.01)

(52) U.S. Cl.
  CPC .............. *B64D 37/22* (2013.01); *B64D 37/06* (2013.01)

(58) Field of Classification Search
  CPC ......... B64D 37/22; B64D 37/02; B64D 37/20
  See application file for complete search history.

(56) References Cited

U.S. PATENT DOCUMENTS

| | | | | |
|---|---|---|---|---|
| 2,239,098 A * | 4/1941 | Hunter | ................. | B64D 37/22 222/487 |
| 2,332,007 A * | 10/1943 | Parker | ................. | B64D 37/22 244/135 R |
| 10,301,034 B2 * | 5/2019 | Tongue | ................. | B64D 37/02 |
| 10,654,581 B2 * | 5/2020 | Morgan | ................. | B64D 37/04 |
| 11,453,472 B2 * | 9/2022 | Cavarero | ............ | B64D 11/003 |
| 11,493,171 B2 * | 11/2022 | Stamm | ................. | F17C 1/06 |
| 2024/0239510 A1 * | 7/2024 | Gambioli | ............. | B64D 37/30 |

FOREIGN PATENT DOCUMENTS

| | | | | |
|---|---|---|---|---|
| EP | 0463567 | A2 | 1/1992 | |
| EP | 3960635 | A1 * | 3/2022 | ........... B60K 15/035 |
| FR | 493564 | A | 8/1919 | |
| GB | 466335 | A | 5/1937 | |
| KR | 20060064914 | A | 6/2006 | |
| RU | 2669913 | C1 | 10/2018 | |

OTHER PUBLICATIONS

EP-3960635-A1 Translation (Year: 2022).*
French Search Report for corresponding French Patent Application No. 2206317 dated Jan. 23, 2023; priority document.

* cited by examiner

*Primary Examiner* — Umashankar Venkatesan
(74) *Attorney, Agent, or Firm* — Greer, Burns & Crain, Ltd.

(57) ABSTRACT

A tank system comprising a tank, a drainage line fixed in the bottom part of the tank and having a drainage port at each end and, for each drainage port, a funnel having a wall through which at least one window passes, a body that can move in translation, for each funnel, a plug that is secured to the body and arranged to be able to move inside said funnel between an open position and a closed position, and an arm, a first end of which is mounted in an articulated manner to the top part of the tank and a second end of which is mounted in an articulated manner on the body.

5 Claims, 2 Drawing Sheets

TANK SYSTEM WITH A VALVE IN THE FORM OF A PENDULUM SYSTEM

CROSS-REFERENCES TO RELATED APPLICATIONS

This application claims the benefit of French Patent Application No. 2 206 317 filed on Jun. 24, 2022, the entire disclosure of which is incorporated herein by way of reference.

FIELD OF THE INVENTION

The present invention relates to a tank system comprising a tank containing a liquid and a valve in the form of a pendulum system, and also to an aircraft comprising such a tank system.

BACKGROUND OF THE INVENTION

In an aircraft, fuel, such as kerosene or dihydrogen, is stored in a tank that is fixed in the aircraft. In order to channel the fuel from the tank to an engine, the aircraft has, in the bottom part of the tank, a drainage line that is fluidically connected to a distribution line that is itself fluidically connected to the engine and to which a pump is connected. The drainage line has a plurality of drainage ports that allow the fuel to flow to the drainage line, and as such the fuel flows from the tank to the engine.

During the various flight phases, the aircraft does not remain horizontal and may assume tilted positions, in particular during take-off, landing and changes in altitude. When the aircraft is in such a tilted position, the liquid fuel is repositioned under the effect of gravity and, depending on the amount of fuel remaining in the tank, one or more drainage ports may end up above the fuel and the pump therefore draws at least some of the gas present in the tank.

In order to avoid such a problem, valves have been developed that comprise, for example, a movable plug that is subject to gravity and blocks off the drainage port when the aircraft assumes an inclined position.

Although such systems yield good results, it is necessary to find systems that are more robust and that in particular ensure that at least one valve is always open.

SUMMARY OF THE INVENTION

One aim of the present invention is to propose an aircraft tank system comprising a tank containing a liquid and a valve in the form of a pendulum system that ensures that one drainage port is closed when the aircraft assumes tilted positions.

To this end, the invention proposes a tank system for an aircraft having a longitudinal direction, said tank system comprising:
 a tank intended to contain a liquid,
 a drainage line that is housed and fixed in the bottom part of the tank, extends parallel to the longitudinal direction, and has a drainage port at each end,
 for each drainage port, a funnel secured to the drainage line, wherein the axis of the funnel is parallel to the longitudinal direction and wherein the top of the funnel opens into the drainage port, wherein the funnel has a wall, through which at least one window passes,
 a body mounted to be able to move in translation parallel to the longitudinal direction,
 for each funnel, a plug that is secured to the body and arranged to be able to move inside said funnel alternately between an open position in which the plug blocks off neither the windows in the funnel nor the drainage port and a closed position in which the plug blocks off at least the drainage port, and
 an arm, a first end of which is mounted in an articulated manner to the tank above the body and a second end of which is mounted in an articulated manner on the body via a connection combining a connection that pivots about an axis perpendicular to the longitudinal direction and horizontal and a connection that slides perpendicular to the longitudinal direction in a plane perpendicular to said axis.

Such a tank system is particularly robust in operation by virtue of the pendulum effect of the arm and ensures that at least one of the ports is always open, regardless of the position of the aircraft.

Advantageously, the tank system comprises a weight, which is fixed to the arm as close as possible to the second end thereof.

Advantageously, each funnel is frustoconical and each plug has a frustoconical shape.

Advantageously, each funnel is extended at the end facing away from the drainage port by a cylinder, the axis of which is parallel to the longitudinal direction, each plug is extended at the end facing away from the drainage port by a cylinder, the axis of which is parallel to the longitudinal direction, and the cylinders of the plugs slide within the cylinders of the funnels.

The invention also proposes an aircraft comprising a distribution line, a pump mounted on the distribution line and a tank system according to one of the preceding variants, wherein the drainage line is fluidically connected to the distribution line.

BRIEF DESCRIPTION OF THE DRAWINGS

The abovementioned features of the invention, along with others, will become more clearly apparent upon reading the following description of an exemplary embodiment, said description being given with reference to the appended drawings, in which.

DETAILED DESCRIPTION OF THE PREFERRED EMBODIMENTS

Figure 1:
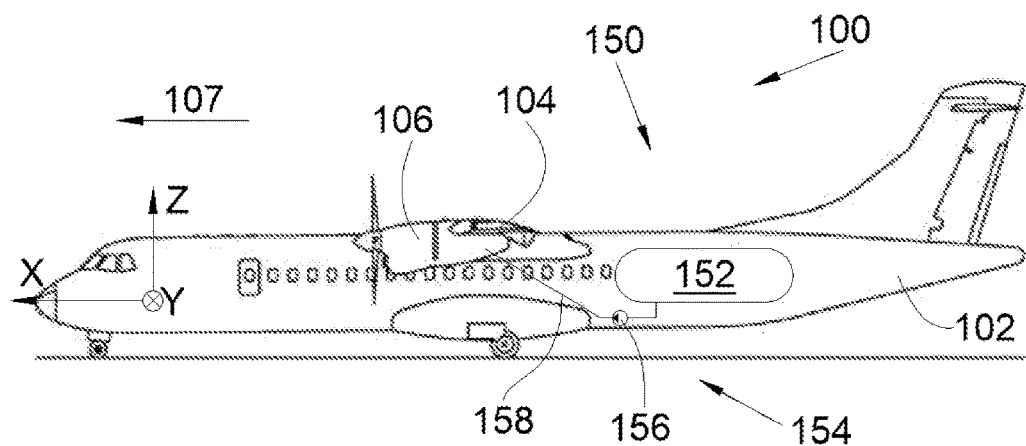
FIG. 1 is a side view of an aircraft according to the invention.

In the description that follows, terms relating to a position are considered in relation to an aircraft in a normal flight position, i.e. as shown in FIG. 1.

In the description that follows, and by convention, the longitudinal direction of the aircraft is denoted by X, the transverse direction, which is horizontal when the aircraft is on the ground, is denoted by Y, and the vertical direction, which is vertical when the aircraft is on the ground, is denoted by Z, these three directions X, Y and Z being mutually orthogonal.

FIG. 1 shows an aircraft 100 comprising a fuselage 102 on each side of which there is fixed a wing 104 that bears at least one engine 106 that runs on fuel such as kerosene or dihydrogen. In the embodiment of the invention presented in FIG. 1, the engine 106 is a propeller engine, but any other type of engine is conceivable.

The arrow 107 indicates the direction of forward travel of the aircraft 100.

The aircraft 100 comprises a tank system 150 according to the invention, which comprises a tank 152 in which the fuel is stored in liquid form. In the embodiment of the invention, the tank 152 is arranged at the rear of the fuselage 102, but a different positioning is possible.

The aircraft 100 also comprises a supply system 154 that provides the fluidic connection between the tank 152 and each engine 106. The supply system 154 comprises, inter alia, a distribution line 158 and a pump 156 mounted on the distribution line 158 and arranged to pump the fuel from the tank 152 and send it into each engine 106.

Figure 2:
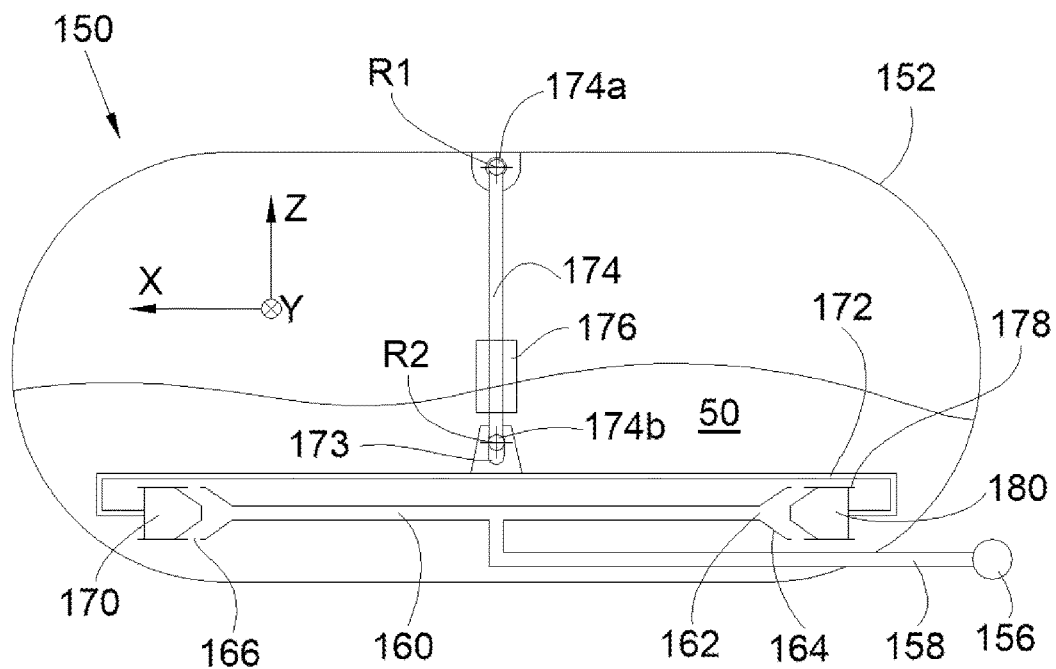
FIG. 2 is a schematic representation of a tank system according to the invention in a horizontal flight position.
Figure 3:
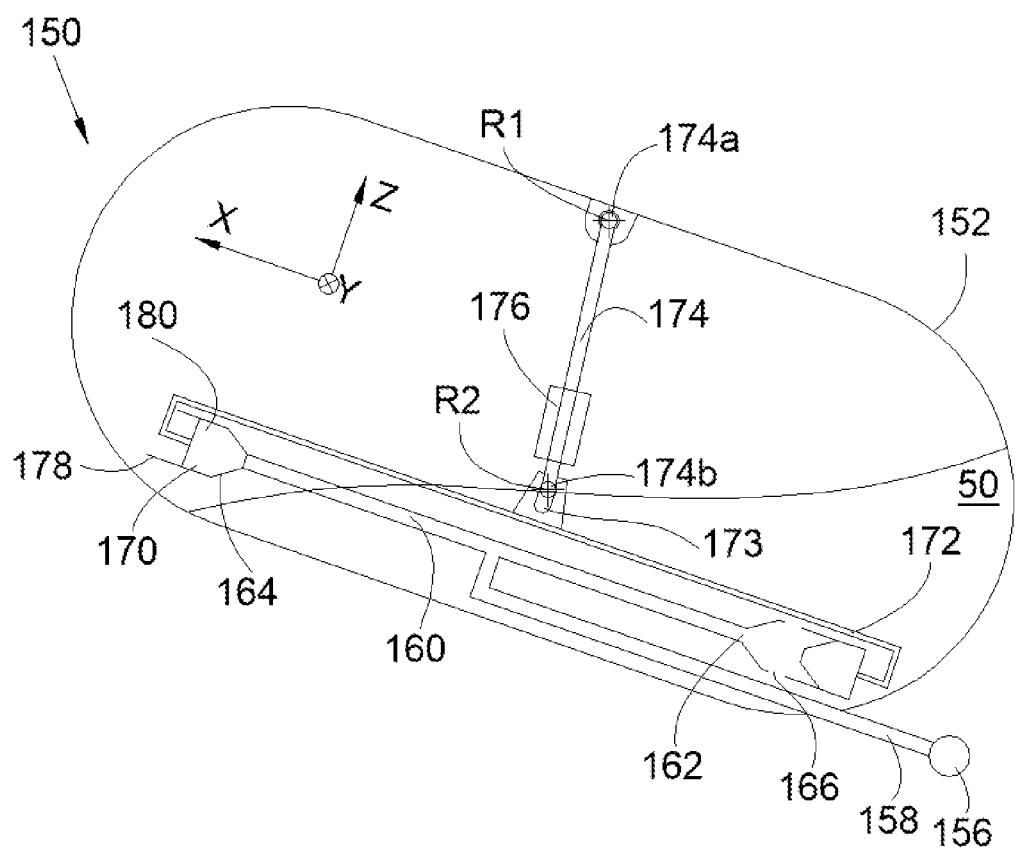
FIG. 3 is a schematic representation of the tank system from FIG. 2 with the aircraft in a tilted position.

FIG. 2 shows the tank system 150 when the aircraft 100 is in a horizontal position, and FIG. 3 shows the tank system 150 when the aircraft 100 is in a tilted position, which may be caused by a take-off or a climb in altitude, for example. In the case of a landing or a descent in altitude, the positioning is reversed and the longitudinal direction X points downwards.

In the embodiment of the invention presented in the figures, the tank 152 has a cylindrical shape, the axis of which is oriented parallel to the longitudinal direction X, but a different shape is also possible, for example a parallelepi-pedal shape.

The tank system 150 comprises a drainage line 160 that is housed and fixed in the bottom part of the tank 152 so as to be immersed in the fuel 50. The drainage line 160 is fluidically connected to the distribution line 158, in this case by way of an elbow in the middle of the drainage line 160.

The drainage line 160 extends parallel to the longitudinal direction X, and has a drainage port 162 at each end.

The tank system 150 comprises, for each drainage port 162, a funnel 164 secured to the drainage line 160, wherein the axis of the funnel 164 is parallel to the longitudinal direction X and wherein the top of the funnel 164 opens into the drainage port 162. In this case, each funnel 164 is frustoconical and points towards the drainage port 162.

The funnel 164 is made up of walls, through at least one of which a window 166, which provides the fluidic communication between the outside and inside of the funnel 164, passes.

Thus, the fuel 50 is drawn by the pump 156 and flows through each window 166 to the inside of the funnel 164 in order to reach the drainage line 160, and then the distribution line 158.

The tank system 150 comprises a body 172 that is rigid and mounted to be able to move in translation parallel to the longitudinal direction X.

The tank system 150 also comprises, for each funnel 164, a plug 170 that is secured to, and therefore moves with, the body 172 and is thus mounted to be able to slide inside the funnel 164, alternately between an open position in which the plug 170 blocks off neither the windows 166 in the funnel 164 nor the drainage port 162 and a closed position in which the plug 170 blocks off at least the drainage port 162 and additionally the windows 166 in the funnel 164. The shape of each plug 170 is adapted to the shape of the funnel 164 in order to create a seal at the drainage port 162. In this case, each plug 170 has a frustoconical shape and points towards the drainage port 162.

In the open position, the fuel 50 flows towards the engine 106 and in the closed position, the drainage port 162 is plugged and nothing can flow through it.

The tank system 150 comprises an arm 174, a first end 174a of which is mounted in an articulated manner to the tank 152 above the body 172, and in this case in the top part of the tank 152. The first end 174a is generally in the middle of the body 172 when the aircraft 100 is in the horizontal position. The arm 174 is housed inside the tank 152.

In the embodiment of the invention presented here, the articulation is in this case a rotation about a first axis R1 that is parallel to the transverse direction Y and in this case the articulation takes the form of a clevis secured to the tank 152 and of a pin parallel to the first axis R1 that is mounted in the clevis and forms the first end 174a.

The arm 174 comprises a second end 174b, which is mounted in an articulated manner on the body 172 via a connection combining a connection that pivots about a second axis R2 perpendicular to the longitudinal direction X and horizontal, i.e. in this case in the transverse direction Y, and a connection that slides perpendicular to the longitudinal direction X in a plane XZ perpendicular to the second axis R2, i.e. in this case in the vertical direction Z.

In the embodiment of the invention presented here, the articulation of the second end 174b takes the form of a clevis secured to the body 172, the holes 173 in which are oblong and wherein the major axis constitutes the direction of the sliding connection, and of a pin parallel to the second axis R2 that is mounted in the clevis and forms the second end 174b.

The arm 174 therefore acts as a pendulum.

Therefore, when the aircraft 100 assumes a tilted position, as in FIG. 3, the arm 174 pivots about the first axis R1 under the effect of gravity and moves the body 172 in translation parallel to the longitudinal direction X. As it moves, the body 172 moves the plugs 170 and the uppermost plug 170 blocks off the drainage port 162 that is uppermost and therefore potentially above the fuel 50 and there is thus no gas present in the tank 152 to enter the drainage line 160 via this drainage port 162, while the other drainage port 162 remains immersed in the fuel 50 and supplies the pump 156 with fuel 50 and as such there is always one drainage port 162 that is open and immersed in the fuel 50. During the movement of the body 172, the second end 174b is free to pivot about the second axis R2 and to move inside the oblong holes 173.

In order to make it easier for the arm 174 to rotate under the effect of gravity, the arm 174 is provided with a weight 176, which is fixed to the arm 174 as close as possible to the second end 174b thereof.

In the embodiment of the invention presented in FIGS. 2 and 3, each frustoconical funnel 164 is extended at the end facing away from the drainage port 162 by a cylinder 178, the axis of which is parallel to the longitudinal direction X. In the same way, each plug 170 is extended at the end facing away from the drainage port 162 by a cylinder 180, the axis of which is parallel to the longitudinal direction X. In this case, the translational guidance of the body 172 and the plugs 170 is thus provided by the cylinders 180 of the plugs 170 that slide within the cylinders 178 of the funnels 164.

However, in another embodiment, the translational guidance may be provided by the body 172 being guided with respect to a fixed element of the tank 152, such as any translational guidance system known to those skilled in the art, for example.

In the embodiment of the invention presented here, the windows 166 are formed in the wall of the cylinder 178, but they may be formed in the frustoconical wall.

Although the invention has been described on the basis of a fuel tank, it may be applied to any liquid-containing tank.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank system for an aircraft having a longitudinal direction, said tank system comprising:
   a tank configured to contain a liquid,
   a drainage line housed and fixed in a bottom part of the tank, the drainage line extending parallel to the longitudinal direction, and having two ends with a drainage port at each end,
   for each drainage port, a funnel secured to the drainage line, wherein an axis of the funnel is parallel to the longitudinal direction, wherein a top of the funnel opens into the drainage port, and wherein the funnel has a wall, through which at least one window passes,
   a body configured to move in translation parallel to the longitudinal direction,
   for each funnel, a plug secured to the body and configured to move inside said respective funnel alternately between an open position in which the plug blocks off neither the windows in the funnel nor the drainage port and a closed position in which the plug blocks off at least the drainage port, and
   an arm having a first end mounted in an articulated manner to the tank above the body and a second end mounted in an articulated manner on the body via a connection combination that pivots about an axis perpendicular to the longitudinal direction and horizontal and slides perpendicular to the longitudinal direction in a plane perpendicular to said axis.

2. The tank system according to claim 1, further comprising:
   a weight fixed to the arm closer to the second end than to the first end.

3. The tank system according to claim 1, wherein each funnel comprises a frustoconical funnel and each plug comprises a frustoconical shape.

4. The tank system according to claim 3, wherein each frustoconical funnel is extended at an end facing away from the drainage port by a cylinder, an axis of the cylinder parallel to the longitudinal direction,
   wherein each plug is extended at an end facing away from the drainage port by a cylinder, the axis of the cylinder parallel to the longitudinal direction, and
   wherein the cylinders of the plugs slide within the cylinders of the funnels.

5. An aircraft comprising:
   a distribution line,
   a pump mounted on the distribution line, and
   the tank system according to claim 1,
   wherein the drainage line is fluidically connected to the distribution line.

* * * * *